No. 652,609. Patented June 26, 1900.
M. W. HANKS.
GLOWER TERMINAL FOR ELECTRIC INCANDESCENT LAMPS.
(Application filed Apr. 22, 1899. Renewed Apr. 28, 1900.)
(No Model.)
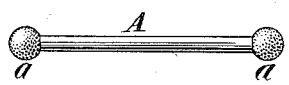
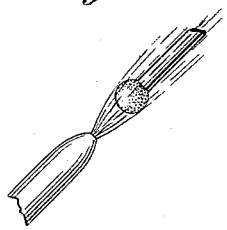 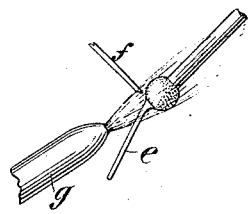
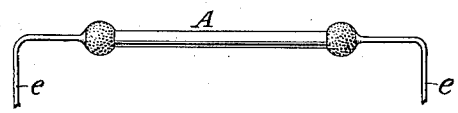
Witnesses:
Raphaël Netter
Marshall W. Hanks, Inventor
by Charles A. Terry, Att'y.

UNITED STATES PATENT OFFICE.

MARSHALL W. HANKS, OF PITTSBURG, PENNSYLVANIA, ASSIGNOR TO GEORGE WESTINGHOUSE, OF SAME PLACE.

GLOWER-TERMINAL FOR ELECTRIC INCANDESCENT LAMPS.

SPECIFICATION forming part of Letters Patent No. 652,609, dated June 26, 1900.

Application filed April 22, 1899. Renewed April 28, 1900. Serial No. 14,762. (No model.)

*To all whom it may concern:*

Be it known that I, MARSHALL W. HANKS, a citizen of the United States of America, and a resident of Pittsburg, in the county of Allegheny and State of Pennsylvania, have invented certain new and useful Improvements in Glower-Terminals for Electric Incandescent Lamps, of which the following is a specification.

In electric lamps of the type now known as "Nernst" lamps, wherein the illuminants or glowers are composed of the rare earths or mixtures thereof—such, for instance, as zirconium, yttrium, cerium and the like—considerable difficulty has been experienced in making the connections between the ends of the glowers and the leading-in wires sufficiently intimate and strong to constitute a durable and efficient union. It has been proposed to wind a fine platinum wire about each end of the glower and to cover this small coil of platinum wire with a paste formed of materials similar to those of the glower itself. It has been found that such terminals are not always reliable and that they sometimes break away from the glower.

The object of the present invention is to obviate the insufficiencies of the terminal connection described and to provide a more lasting and efficient union between the leading-in wires and the end of the glowers by means which will be hereinafter described. The first step in the process of accomplishing this result usually consists in applying to the ends of the glowers beads or enlargements formed of chalk-like porous materials, these beads or enlargements being applied either by forming them independently of the glowers and afterward molding and pressing them into shape on the ends of the glowers or by adding them in the form of a paste to the glower ends either by dipping or by the use of a brush or other convenient means. When the beads or enlargements of chalk-like materials have been thus applied to the glower ends, they are subjected to the action of an oxyhydrogen flame or its equivalent a sufficient length of time to thoroughly bake the material. The beads or enlargements are thus rendered sufficiently hard to preclude any material danger of destruction during subsequent manipulation. I then usually apply the leading-in wires by fusing them upon these enlargements by means of some conducting alloy—such as copper platinum, nickel platinum, manganoxid platinum, or the like. I have found that by treating a porous chalk-like bead of this sort after it has been applied to the ends of a glower with heat sufficient to bake it there will be no further shrinking of the bead, and any union which I make between such a bead and a leading-in wire is well suited to remain unbroken and to maintain itself under all the conditions of actual operation.

I have obtained excellent results from the oxids of calcium, magnesium, and kaolin, also of zirconium, yttrium, cerium, and the like. A good mixture may be formed, for instance, by mixing kaolin with water, and dextrine or kaolin and calcium oxid mixed together with a suitable binding material may be employed, or kaolin, calcium oxid, and magnesia. These and other earth oxids, such as mentioned, may be used either singly or in combination with each other and with a suitable binding material.

In the drawings which accompany this specification, Figures 1, 2, 3, and 4 illustrate different stages in the manufacture of the glowers and in the process of applying the terminals and attaching the leading-in wires.

Referring to the drawings, A, Fig. 1, represents a glower composed of a rare earth or a mixture of rare earths and having on its end beads or enlargements *a a*. The process by which the enlargements *a a* are formed or placed upon the ends of the glower is preferably one of the following—that is to say, either a bead of chalk-like porous material is formed independently of the glower and molded and pressed upon its ends, or the ends of the glower are dipped in a paste of such chalk-like porous material enough times to make the beads or enlargements of the size desired, or such a paste has been added with a brush until the proper thickness of chalk-like material has been added to the ends of the glower. The glower, as it appears in Fig. 1, with the beads attached, is then treated, as is shown in Fig. 2, by being baked in an oxyhydrogen flame or its equivalent, which process serves not only to bake the beads, as described, but also to bring about, by means of the heat applied, a perfect union between the beads and the ends of the glower.

The glower after treatment by heat, as illustrated in Fig. 2, is brought into contact at its ends with the end of a leading-in wire e, Fig. 3, a conducting alloy f, of copper platinum, manganoxid of platinum, or the like, being applied simultaneously therewith or as a previous step in the process. Being subjected to heat in the presence of such a conducting alloy the end of the glower and the end of the leading-in wire become firmly united, and in practice I find that the union thus made is electrically adequate and mechanically strong and little liable to rupture.

In Fig. 4 I show a glower in its complete state and having the leading-in wires attached as described in the foregoing specification.

It will be observed that the material constituting the solder or means of connection between the leading-wires and the ends of the glower extends over a sufficient surface to afford a good mechanical connection between the leading-wires and the glower-terminals. This device serves also to improve the electrical union of the two elements brought together in this way.

While the chalk-like material will usually appear as beads or enlargements on the ends of the glowers, yet the object sought to be attained is ultimately the providing of a glower-terminal to which the leading-wires can be readily and durably attached. Terminals of such material appearing in any other form than that of beads or enlargements would be quite within the scope of the present invention.

Should the leading-wire be of a metal other than platinum, the alloy may well contain as one of its constituents some other metal as a substitute for the platinum.

The apparatus herein referred to is not claimed in this application, but forms the subject of another application for patent filed by me September 27, 1899, Serial No. 731,792, as a division hereof.

I claim as my invention—

1. The hereinbefore-described method of securing a permanent union between the leading-wires and the glower-terminals in lamps of the type described, which consists in securing to the ends of the glowers a chalk-like porous material, then baking the same upon the said ends and attaching the leading-in wires to the baked material by any suitable conducting-solder.

2. The hereinbefore-described method of manufacturing glowers for electric lamps which consists in making a strip, rod or other shaped incandescing body of rare earths or a mixture thereof, applying to the ends thereof beads or enlargements of chalk-like porous material, and then baking the said beads or enlargements.

3. The hereinbefore-described method of attaching a lead-wire to a glower having a terminal in form of a baked porous material which consists in applying the end of the leading-wire to the said terminal and heating both the terminal and the end of the wire in the presence of a suitable conducting-solder.

4. The hereinbefore-described method of uniting the terminals of a glower for incandescent lamps to the leading-wires which consists in forming upon the said glowers suitable terminals of baked porous material which is a non-conductor when cold and attaching the said leading-wires to the said terminals through the medium of a material serving both as a conductor of electricity and as a good mechanical connection between the elements.

Signed by me at Pittsburg, Pennsylvania, this 18th day of April, 1899.

MARSHALL W. HANKS.

Witnesses:
WESLEY G. CARR,
H. C. TENER.